June 1, 1965 R. G. McCLOSKEY ETAL 3,186,704
PIPE HOLDING DEVICE
Filed July 18, 1962
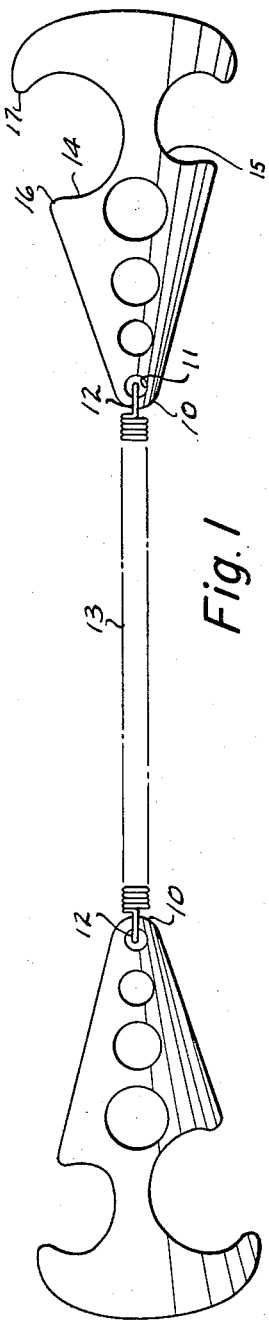
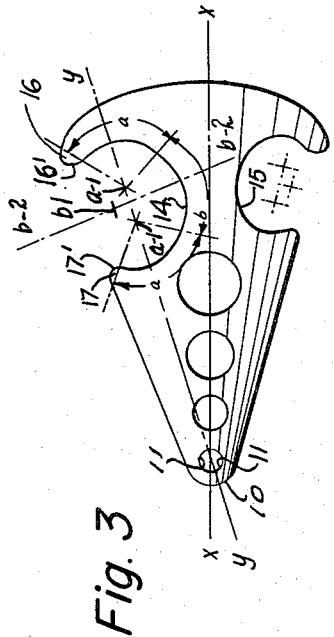
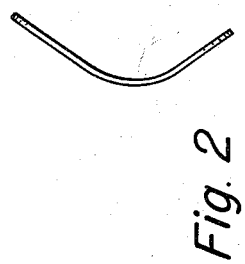
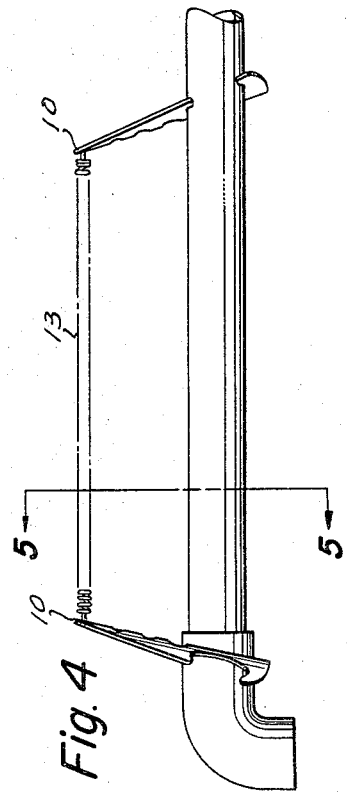
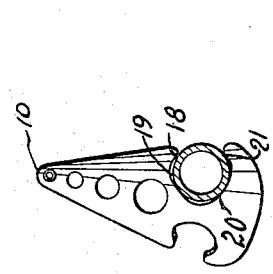
INVENTOR.
Richard G. McCloskey
BY Heinrich H. Frank
J. D. Douglass
their Attorney United States Patent Office 3,186,704
Patented June 1, 1965

3,186,704
PIPE HOLDING DEVICE
Richard G. McCloskey, Sandusky, and Heinrich H. Frank, Elyria, Ohio, assignors to The Ridge Tool Company, Elyria, Ohio, a corporation of Ohio
Filed July 18, 1962, Ser. No. 210,728
3 Claims. (Cl. 269—9)

This invention relates to holding devices and more particularly to an apparatus for holding rods or tubes in position while they are being joined by soldering or brazing.

In the installation of pipes such as are used for conducting water or other fluid, it has become common practice to use couplings, connectors and tubing which are secured together by soldering. When a coupling or connector is to be secured to the end of a pipe, the pipe is inserted in the connector and the junction heated, solder applied to the joint, into which it flows by capillary attraction. This provides a firm, non-leaking joint. The above is the common procedure, especially with copper plumbing. It provides a good joint and is easy and economical to install.

In the practice of the above, the nipple, elbow or other device which is to be attached to the pipe, is provided with an opening which is slightly larger than the pipe, which is telescoped into the opening. After assembly the parts must be held while the joint is heated and the solder applied. Previously the workman relied upon a close enough fit to hold the parts in place. Frequently, however, the fit was so loose that the fitting slipped from the position in which it was originally placed during the heating and required the use of additional hands to hold it in the exact place while the solder was being applied. Since the approved method was to apply heat to the joint by some kind of a torch, it will be appreciated that the parts became very hot and were difficult to handle. This is particularly true of copper tubing and the fittings where the conductivity was so great that the heat traveled a considerable distance from the joint. The above was particularly difficult when the joining of the parts was overhead.

By the present invention the workman can assemble the pipe and fitting, then apply the holding device of this invention, which will securely hold the parts in position. He then has both hands free to control the heating torch and the solder. Thus he can do the job quicker, easier and better. The holding power of the device is not disturbed in any manner until the device is removed after the solder has frozen.

Still other advantages of the invention and the invention itself will become more apparent from the following description of an embodiment thereof, which description is illustrated by the accompanying drawings and forms a part of this specification.

In the drawings:

FIG. 1 is a plan view thereof;

FIG. 2 is an end elevational view of one of the holding elements;

FIG. 3 is a detail of the holding device in one stage of manufacture;

FIG 4. is an elevational view of the device applied to an elbow and a straight run of pipe for holding the elbow and pipe in position during a soldering operation; and FIG. 5 is a view of one of the holding elements in position on a tube.

Briefly, the invention comprises a pair of pipe or fixture engaging members and a spring connected between the two members whereby tension may be placed on the members and in turn upon the pipe and fixture to hold them together.

The device will be described in connection with its use for holding the end of a pipe in an elbow. It will be appreciated, however, that it may be used for holding any of the customarily used fixtures in place relative to each other or a pipe. Other ways in which the device may be used will be apparent to those versed in the art.

As best shown in FIG. 1, each of the holding members is preferably of a generally pear shaped profile and includes an apex 10, having an opening 11 by means of which the looped end 12 of a spring 13 may be attached. The spring is a conventional helix type with the convolutions close together. The spring may be connected to a ring, not shown, which in turn is connected to the holding member.

It will also be appreciated that the spring could be attached to the holding member by snaps which would facilitate the removal of the spring and that in this case springs of various length or strength could be used, thus increasing the versatility of the device.

The broad end of the holding member is provided with C shaped recesses 14 and 15 which extend into the body from opposite sides thereof. The recesses are of generally semi-circular formation and at the entrance the points 16 and 17, which define the entrances, are spaced apart slightly less than the major diameter of the recesses. In the embodiment shown the diameter of the recess 14 is designed to receive a pipe of one size and that of the recess 15 a pipe of a smaller size.

As best shown in FIG. 3, the preferred form of the recesses depart from the circular formation in that the recesses, when designed for holding a certain size of pipe are formed, when the element is in its flat state, with a pair of radii in the zones $a$ which are smaller than the radius for the zone $b$. For instance, if the recess 14 is for holding ¾" pipe, the radius of $b$ could be ½" and $a$ ⅜". The loci for the radii of the zones $a$, designated "$a$–1" are spaced apart ¼" and inwardly of the radius $b$, the locus for which is designated $b$–1, and said radius being located on a line $b$–2, which is perpendicular to the edge of the plate, and bisecting said recess. Said loci for the zones $a$ also lying on the major axis $y$—$y$ of the recess. This provides a major diameter for the recess of 1". The opening 15 is made to a corresponding contour but with radius $a$ being ⁷⁄₃₂ and $b$ being ²⁵⁄₆₄ when it is desired to hold ½" pipe.

It will be noted that the points 16 and 17 may be provided with flat surfaces 16' and 17', facing each other, which are parallel and that the spacing between these surfaces is less than the major diameter of the recess, in this instance approximately .9" for the recess 14.

It will be appreciated that these dimensions may be varied if desired, but it has been found that a preferred form of operation is realized if this general form and proportion for the recesses are used.

The arcs $a$ defined by this ⅜" radii terminate at their outer ends at the throat of the recess and at their inner ends at the junction with the ends of the arc $b$. The wall thus defined, if used to engage a ¾" copper tube, which tube is actually ⅞" in diameter, engages the tube at the four points 18, 19, 20 and 21, FIG. 5, spaced around the periphery, these points being at the four ends of the zones $a$, as indicated. This provides a balanced engagement of the element with the tube.

The major axis of each of the recesses bisects the arcs $a$ and line $y$—$y$ in prolongation of this axis intersects the axis of the opening 11. By this arrangement, when the holding element is on a cylindrical pipe or rod, the pressure at the points of contact with the tube or rod are distributed equally on opposite sides of the tube axis. This prevents the device from tilting around its longitudinal axis regardless of which side is being used.

The holder element is preferably formed by first stamping the device with its opening 11 and recesses 14–15, from flat sheet metal. After stamping, it is then bent along a longitudinal line X—X which is equally spaced from the inner edges of the recesses 14 and 15, this portion being bent on a ⅝" radius, as shown in FIG. 2. This leaves the portions of the parts on opposite sides of the line X—X where the recesses are disposed substantially flat. It will be noted that spring 13 exerts a pull, when in use, by its attachment in the opening 11 which is on a line which extends through the axis of the opening 11 and the major axis of the recess being used, and that there is therefore no tendency for the device to be canted around the line X—X when in use. FIG. 4 illustrates one manner of use of the device. In this instance, an elbow is being applied to a straight piece of pipe or tubing. If the pipe is ½" pipe, one holding element would be placed with the recess 15 surrounding the pipe. The other holding element could be placed on the elbow, as shown, or it could be merely hooked around the other leg of the elbow. The amount of tension on the parts can be varied by raising the right hand holding element to a position normal to the pipe, sliding it along the pipe until the desired stretching of the spring is obtained, after which it is allowed to tilt to the position shown where it no longer slips on the pipe and the pipe and elbow are pulled together.

The two holding elements can be placed on the pipe in any position, that is with the convex sides toward or away from each other. Furthermore, they may be placed on the pipe in such a position that the spring would not have to be parallel to the pipe, due to the balanced relation where the four inward projections are formed by the ends of the zones *a* and the pulling power is along the line of the major axis which bisects the zone *a* and is midway between those points of contact with the pipe.

Having thus described the invention in an embodiment thereof it will be appreciated that numerous and extensive departures may be made therefrom without departing from the spirit or scope of the invention as defined by the appended claims.

We claim:
1. A device for holding in end opposed engaged relation a pair of elongate bodies of curved cross section, said device consisting of two elongate plate elements and a connecting spring therebetween, each of said plate elements consisting of a plate having convergent side edges forming an apex and a broad transverse base edge, there being an aperture in the apex end of each plate in which an end of said spring is engaged, each of said elements having an article engaging socket recess extending from a side edge of the element into the element, said socket recess being defined by an edge wall, the longitudinal center line of which recess is in alignment with the center of the aperture in the apex end of the element in which aperture an end of the spring is connected, said edge wall being formed on opposite ends of said center line by a pair of arcs the curvature of which arcs is smaller than the curvature of the body to which the device is to be attached and determined by radii, the loci of which are spaced apart from each other and which arcs extend equidistant on each side of the said center line, and a third portion of the recess edge wall being formed by an arc of larger radius than the first arcs and connected to the adjacent ends of the first arcs and providing with said ends and with the other ends of the first arcs, four inwardly projecting abutments for engagement with the curved surface of the elongate body at equidistantly spaced points on opposite sides of the latter.

2. The invention as defined by claim 1, wherein each of said elements is provided with another recess formed as stated and which extends into the element from the other side edge of the latter, and said elements are bent intermediate said recesses along a longitudinal center line midway between the inner edges of the recesses and intersecting the said center of the opening at the apex end of the element.

3. The invention as defined by claim 1, wherein said other ends of the first arcs terminate inwardly of the adjacent edge of the plate element and join short straight substantially parallel edge wall portions extending to the said adjacent edge of the plate.

References Cited by the Examiner
UNITED STATES PATENTS

| | | | |
|---|---|---|---|
| 836,303 | 11/06 | Christensen | 294—92 |
| 894,923 | 8/08 | Vicksell | 294—82 XR |
| 1,208,522 | 12/16 | Duncan | 269—9 |
| 1,315,238 | 9/19 | Peters | 269—9 |
| 1,838,249 | 12/31 | Brown | 113—102 |
| 2,110,515 | 3/38 | Weaver | 294—92 XR |
| 2,187,878 | 1/40 | Hill et al. | 113—102 |
| 2,363,229 | 11/44 | Cade | 294—92 |
| 2,590,487 | 3/52 | Axelstrom | 294—92 XR |

CHARLES W. LANHAM, *Primary Examiner.*

JOHN F. CAMPBELL, *Examiner.*